Feb. 3, 1970 HENRI-GEORGES DOLL 3,493,849
METHODS AND APPARATUS FOR INVESTIGATING EARTH FORMATIONS
WHEREIN THE VERTICAL RESOLUTION OF A FIRST EXPLORING
MEANS IS ALTERED TO APPROXIMATE THE VERTICAL
RESOLUTION OF A SECOND EXPLORING MEANS
Filed July 31, 1968 2 Sheets-Sheet 1

INVENTOR.
HENRI-GEORGES DOLL
BY Edward M. Roney
ATTORNEY

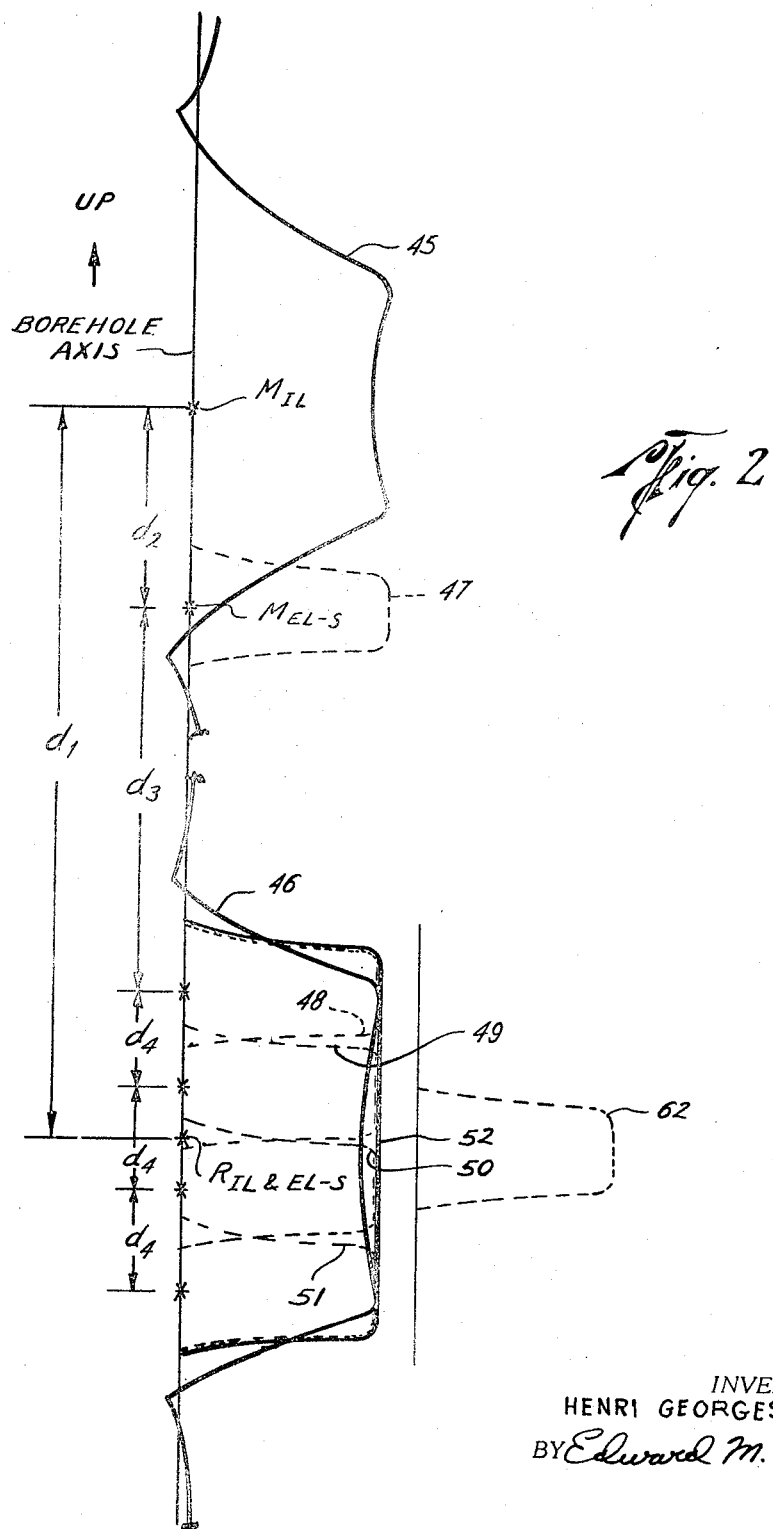

United States Patent Office 3,493,849
Patented Feb. 3, 1970

3,493,849
METHODS AND APPARATUS FOR INVESTIGATING EARTH FORMATIONS WHEREIN THE VERTICAL RESOLUTION OF A FIRST EXPLORING MEANS IS ALTERED TO APPROXIMATE THE VERTICAL RESOLUTION OF A SECOND EXPLORING MEANS
Henri-Georges Doll, New York, N.Y., assignor to Schlumberger Technology Corporation, New York, N.Y., a corporation of Texas
Filed July 31, 1968, Ser. No. 749,158
Int. Cl. G01v 3/00, 3/12
U.S. Cl. 324—1                    8 Claims

ABSTRACT OF THE DISCLOSURE

In accordance with an illustrative embodiment of the invention, a technique is shown for matching the vertical resolution of one earth formation exploring means with another earth formation exploring means by processing the measurement signals in a given manner. More particularly, the measurement signals derived from the exploring means having a sharper resolution are sampled and memorized at various depth levels throughout the borehole. Certain of the memorized measurement signals are then combined in a manner to produce a resulting measurement signal which has a vertical resolution characteristic approximating that of the measurement signal derived from the other exploring means.

---

Figure 1:
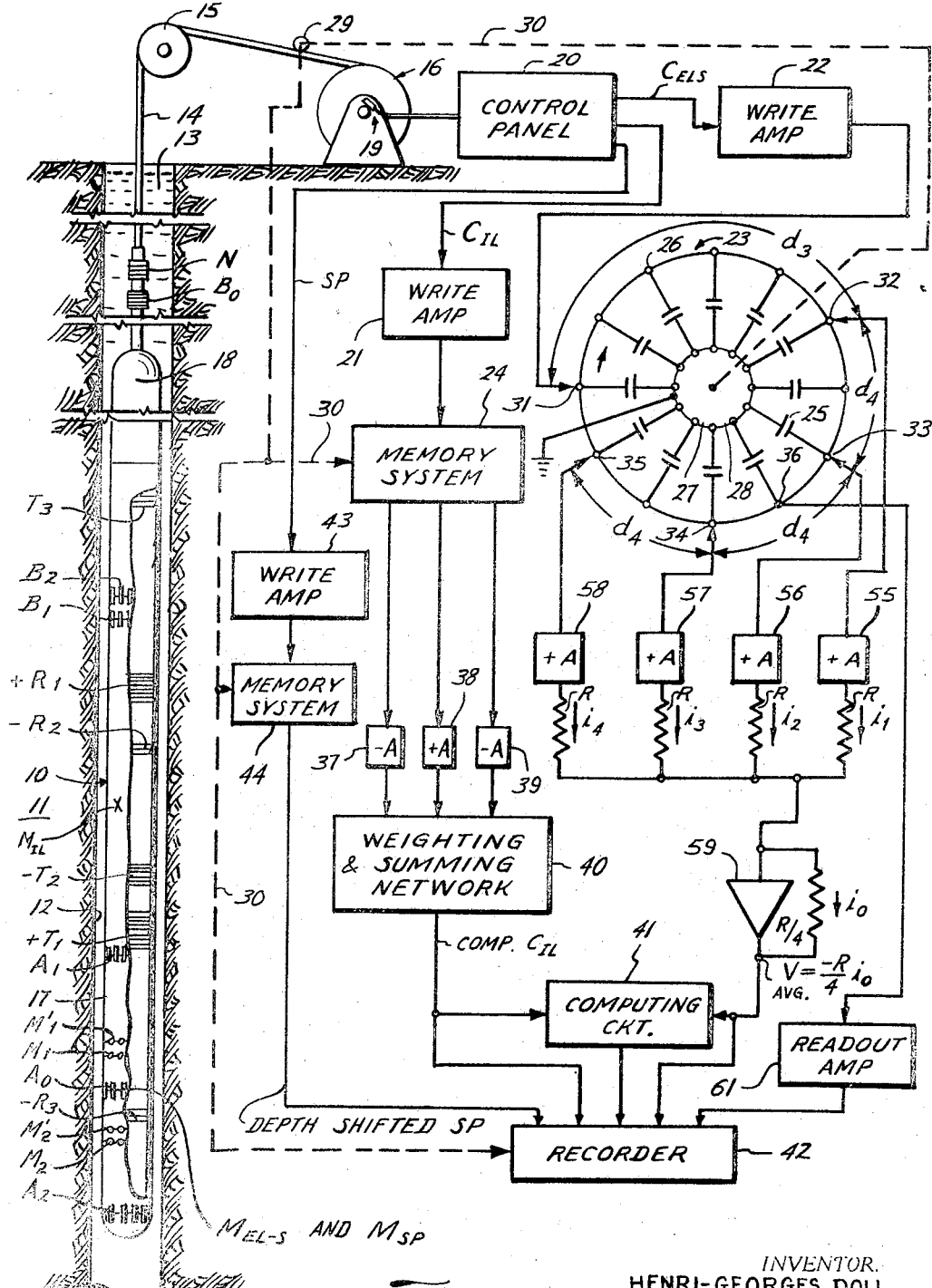

This invention relates to methods and apparatus for obtaining well logging measurements and processing these well logging measurements to provide improved indications of subsurface conditions or characteristics. More particularly, the invention pertains to new and improved methods and apparatus for processing well logging measurements derived from a plurality of downhole exploring devices so as to provide measurements which are in a suitable form for computation or correlation with one another.

In the logging of subsurface earth formations surrounding a borehole, an investigating apparatus having one or more exploring means is moved through the borehole and investigates the surrounding earth formations to provide one or more output signals which are recorded to produce one or more "logs" on a recording medium, e.g., a film. These output signals vary in accordance with variations of one or more characteristics of the formations. In electrical logging, for example, the output signal varies in accordance with the electrical resistivity or conductivity of the subsurface earth formations. In any case, the vertical resolution of different ones of the exploring means are usually different from one another. Some of the exploring devices will have a relatively sharp or high degree of vertical resolution while other exploring devices will have rather low vertical resolutions such that they are responsive to large volumes of the formations.

When speaking of the vertical resolution of these boreholes exploring devices, a vertical resolution characteristic called the vertical geometrical factor (hereinafter called VGF) is frequently utilized to more definitely define this vertical resolution. The VGF of an electrical logging type investigating apparatus, for example, describes the relative response of the investigating apparatus as a function of relative borehole depth as the investigating apparatus passes from $-\infty$ to $+\infty$ through a thin conductive bed extending radially outward from the borehole to $\infty$ and surrounded by beds of zero conductivity. To make it easier to use, this VGF is usually normalized to unity. Thus, $$\int_{-\infty}^{+\infty} x\, dz$$

is made equal to 1 where $x$ is the relative response and $dz$ is a depth increment, i.e., $z$ corresponds to the axis of the borehole. This same procedure can be used to find the VGF if other formation characteristics than conductivity (or its reciprocal, resistivity) are being investigated, i.e., if other than electrical logging type exploring devices are being utilized.

There have been proposed several techniques for narrowing the vertical resolution or VGF of borehole exploring devices. One such technique for accomplishing this is to provide additional transducer elements in the downhole exploring device to compensate for or to cancel the undesired part of the response so that the effective vertical resolution of the apparatus is substantially improved. For example, in logging by electromagnetic principles, which is referred to as "induction logging," so-called "focusing" coils are added to the downhole exploring device to cancel to a large extent the response of the apparatus to the so-called "shoulder" regions lying immediately above and below the active portion of the apparatus.

Another technique for sharpening the VGF of an exploring device is by utilizing the signal processing technique set forth in U.S. Patent No. 3,166,709 granted to H. G. Doll on Jan. 19, 1965. This Doll patent teaches the principle of storing or memorizing well logging measurement signals obtained at various vertically spaced depth levels in the borehole and subsequently combining these signals in an appropriate manner to produce a resultant signal that corresponds to the signal that would have been obtained with an exploring means having better vertical resolution.

However, for one reason or another, there are limits on the sharpness of the vertical response of any given tool, even when utilizing one or both of these above-mentioned techniques. Thus, it is many times the case that some exploring devices have sharper vertical responses than other exploring devices, even after utilizing one or both of the above techniques to sharpen or narrow the vertical response characteristic.

For most applications, the fact that one exploring device has a much sharper vertical resolution characteristic than another is not disadvantageous. However, there are situations where it would be desirable that the vertical resolutions of one or more exploring devices be substantially the same. One such situation is where the measurement signals from a plurality of exploring devices are combined in a computer of one type or another to produce computed well logging measurement signals. One example of this can be found in copending application Ser. No. 553,450 by Jean L. Dumanoir filed on May 27, 1966, which shows the combination of a deep investigation conductivity signal with a shallow investigation conductivity signal to produce a computed signal. This computed signal is then compared or correlated with another measurement to gain valuable information as to the nature of the subsurface formations.

In any event, where two or more measurement signals having different vertical resolutions are combined, the resulting computed measurement signal would tend to fluctuate in accordance with the measurement signal derived from the tool having the sharper vertical resolution characteristic, thus making any meaningful interpretation of the results difficult.

Another situation where it would be desirable to have the vertical resolutions of the exploring devices substantially the same is where the measurement signals derived from a plurality of exploring devices are utilized for correlation purposes, e.g., where two or more logs are examined to define similarities therein. If the exploring device which produced one of the logs had a substantially greater resolution than the other exploring device, it would be difficult to correlate the two logs because of the fluctuations of the "sharper" log. In effect, these rapid fluctuations would appear as noise in the correlation process.

It is an object of the invention therefore to provide new and improved methods and apparatus for investigating earth formations.

It is another object of the invention to provide new and improved methods and apparatus for processing well logging measurement signals derived from a plurality of exploring devices in such a way that the vertical resolution characteristic of the measurement signals will be substantially the same, i.e., so that the processed measurement signals will appear as if the exploring means which produced them had approximately the same vertical resolutions.

In accordance with the present invention, a method for investigating earth formations comprises producing first and second measurements of at least one characteristic of earth formations traversed by a borehole with first and second exploring means, the vertical resolution which is characteristic of the first measurement being less than that for the second measurement. The invention further comprises storing the measurements derived from the second exploring means, said stored measurements representing measurements taken at selected depth levels throughout the borehole, and combining a predetermined number of said stored measurements to produce an output measurement which has a vertical resolution characteristic approximating the vertical resolution characteristic of said first measurement. Apparatus for practicing the method is further provided.

For a better understanding of the present invention, together with other and further objects thereof, reference is had to the following description taken in connection with the accompanying drawings, the scope of the invention being pointed out in the appended claims.

Referring to the drawings:

FIGURE 1 shows a representative embodiment of apparatus for practicing the present invention; and FIGURE 2 shows a graphical presentation of the vertical resolutions obtained with the FIGURE 1 apparatus to be utilized as an aid in understanding the present invention.

Referring to FIGURE 1 of the drawings, there is shown a borehole logging apparatus 10 for investigating subsurface earth formations 11 traversed by a borehole 12. The borehole 12 is filled with a conductive drilling fluid or drilling mud 13. The downhole logging apparatus 10 is suspended from the surface of the earth by means of an armored multiconductor cable 14. This cable 14 passes over a pulley 15 to a drum and winch mechanism 16 whose operation serves to move the logging apparatus 10 through the borehole 12.

The logging apparatus 10 includes an elongated cylindrical support member 17 to which are secured various coils and electrodes for performing the borehole measurements. Secured to the upper end of the support member 17 is a cylindrical fluid-tight housing 18 which contains various electrical circuits for operating the coil and electrode systems. The resulting measurement signals are sent up the conductors in the cable 14 and removed therefrom by means of a suitable brush and slip ring mechanism 19, whereupon they are supplied to a surface located control panel 20. The logging apparatus 10 is described in greater detail in copending U.S. patent application Ser. No. 240,568, filed on Nov. 28, 1962 in the name of G. Attali.

Briefly, the support member portion 17 of the logging apparatus 10 includes an induction logging system represented by the transmitter coils $+T_1$, $-T_2$, and $-T_3$ and receiver coils $+R_1$, $-R_2$, and $-R_3$. As set forth in the copending Attali application, the number of turns and polarity of the coils and spacings between the coils act to provide a measurement of $R_t$, the resistivity of the virgin or uncontaminated portion of the earth formation.

The support member 17 further includes a second exploring device which provides a shallow investigation of the adjoining earth formations. The second exploring device is the electrode system represented by the electrodes $A_1$, $M_1'$, $M_1$, $A_0$, $M_2$, $M_2'$, $A_2$, $B_0$, $B_1$, $B_2$ and N. This shallow investigation electrode system, designated "EL–S," measures the electrical conductivity of the formation material fairly close to the wall of the borehole. As such it will, under favorable conditions, provide indications of the resistivity $R_{xo}$, this being the resistivity of the portion of permeable earth formations which is flushed or invaded by the drilling mud filtrate fluid.

The $A_0$ electrode is also used to measure the spontaneous potential in the borehole. This spontaneous potential, designated "SP," depends in part upon the chemical reaction between the drilling mud fluid and the connate formation water. This battery-type reaction produces direct-current electromotive force.

The measure points for the coil system, electrode system, and SP exploring devices are represented by the symbols $M_{IL}$, $M_{EL-S}$, and $M_{SP}$ respectively in FIGURE 1. $M_{EL-S}$ and $M_{SP}$ coincide with the $A_0$ electrode and $M_{IL}$ is a given distance thereabove.

The various measurement signals derived from the downhole exploring devices are transmitted up the cable 14 and are supplied by way of the control panel 20 to low output impedance amplifiers 21, 22 and 43. The write-in amplifier 22 supplies the shallow investigation conductivity signal $C_{EL-S}$ to a memory system 23, the write-in amplifier 21 supplies the induction logging conductivity signal $C_{IL}$ to a memory system 24, and the write-in amplifier 43 applies the SP signal to a memory system 44. Among other things, the memory systems operate to depth synchronize the various measurement signals. Only the memory system 23 will be shown in detail, the memory systems 24 and 44 being of a similar construction.

Memory system 23 includes a plurality of storage condensers 25 which are each connected between an external contact point 26 and an internal slip ring member 27. A sliding brush member 28 maintains continuous contact with the slip ring member 27 so as to keep the slip ring member 27 grounded. The memory system 23 is caused to rotate in step with the movement of the downhole investigating apparatus 10 through the borehole by means of a measuring wheel 29 and a mechanical linkage which connects the memory system 23 to the measuring wheel 29. The measuring wheel 29 engages the cable 14 so as to rotate in accordance with the movement of the cable 14. The memory systems 24 and 44 are maintained in synchronism with borehole depth by the mechanical linkage 30 also.

The signal from write-in amplifier 22 is supplied to the storage condensers 25 by way of a contact brush 31. In this manner, each condenser is charged to a value depending on the signal voltage when it is in contact with the brush 31. To facilitate this process, the amplifier 22 is provided with a very low output impedance so that the condensers 25 can quickly charge or discharge to the proper voltage. The signal voltages stored on the various condensers 25 are subsequently read out by means of a plurality of output contact brushes 33–36.

Instead of using a rotating capacitor memory, stepping relays and stationary condensers may be used to provide the FIGURE 1 memory systems, as is described in greater detail in U.S. Patent No. 3,181,117 granted to W. J. Sloughter on Apr. 27, 1965. Or, if desired, a rotating magnetic memory, a digital memory, or any other type of memory could be utilized in place of the rotating capacitor memory.

Three depth spaced samples of the induction logging conductivity signal $C_{IL}$ are supplied from the memory system 24 by way of amplifiers 37, 38 and 39 to a weighting and summing network 40. For the amplifiers, a minus sign denotes a polarity reversal and a plus sign denotes the output is of the same polarity as the input. The weighting and summing circuit 40 serves to combine selected fractions of the three signal samples to provide a single resultant signal value representing a more accurate measurement of a narrower vertical increment of the earth formations. This "computed focusing" technique is described in greater detail in the above-mentioned Doll Patent No. 3,166,709.

The resulting computed induction logging conductivity signal is supplied to a computing circuit 41 and to a multichannel recorder 42 whose recording medium is driven as a function of depth by the mechanical linkage 30.

Before proceeding with the description of the remainder of the FIGURE 1 apparatus, it would first be desirable to examine the VGF's (i.e., vertical response characteristics) of the coil system and electrode system exploring devices of FIGURE 1. Thus, referring to FIGURE 2, there is shown the VGF 45 of the induction logging coil system. The measure point for this VGF 45 is designated "$M_{IL}$." (A measure point is usually situated such that the VGF area above the measure point is equal to the VGF area below the measure point.) By storing the coil system conductivity signals $C_{IL}$ and subsequently weighting the stored signal in accordance with the teachings of the above-mentioned Doll patent, the VGF 46 of FIG. 2 is produced. This computed VGF is somewhat sharper than the original VGF 45, and thus the vertical resolution of the computed signal from weighting and summing network 40 is substantially greater than the vertical resolution of the original signal $C_{IL}$. Another way of saying the same thing is to say that the computed signal corresponds to the signal that would be obtained from an exploring device having the VGF 46 instead of the VGF 45.

Since the memory system 24 stores the induction logging measurement signals $C_{IL}$ over a given depth interval before reading these measurement signals out to the weighting and summing network 40, the effective recording point for the computed induction logging measurement signals will be a given depth interval below the measure point $M_{IL}$. Thus, the new computed VGF 46 of FIGURE 2 will be displaced by an interval $d_1$ from the original VGF 45. The recording point of the new computed VGF 46, designated $R_{IL\&EL-S}$, will thus be displaced by the interval $d_1$ from the measure point $M_{IL}$ of the original coil system VGF 45.

There is also shown in FIGURE 2 the VGF 47 (shown in dotted line form) for the electrode system. The measure point $M_{EL-S}$ for this VGF 47 is displaced an interval $d_2$ from the measure point $M_{IL}$ for the induction logging VGF 45. It should be noted here that the geometrical factor theory does not apply as nicely to electrode type exploring devices as for induction or coil type exploring devices. That is to say, there are conditions which can cause the VGF 47 to change shape slightly. However, the VGF of an electrode type exploring device will not vary to a considerable extent, and thus, is used here as as convenient means for illustrating the operation of the present invention.

It can be seen in FIGURE 2 that the vertical resolution characteristic of the electrode system is substantially greater (i.e., substantially narrower) than that for the coil system. When combining measurement signals derived from these two exploring devices, it can be seen that the disparity in the vertical resolutions of the two devices will make interpretation of any computed signal obtained from the combination of these two measurement signals very difficult. To solve this problem, the electrode system measurement signals corresponding to the VGF 47 are sampled and memorized at a plurality of depth points throughout the borehole. Then, a plurality of the memorized measurement signals are combined to produce a resulting VGF that approximates that of the computed induction logging measurement signal represented by the VGF 46 of FIGURE 2.

Thus measurements are taken at selected depth levels throughout the borehole to produce the measurement signal $C_{EL-S}$ corresponding to the VGF 47. These measurement signals are then memorized for desired depth intervals and then combined in a manner to produce a resultant signal which has a VGF approximating that of the computed VGF 46. The memorized measurement signals corresponding to the VGF's 48–51 represents the memorized signals which are combined. By positioning these VGF's 48–51 as shown in FIGURE 2 and summing the memorized measurement signals corresponding to these VGF's, a measurement signal having a vertical resolution which corresponds to the VGF 52 is produced. It can be seen from FIGURE 2 that the measurement signal corresponding to VGF 51 is stored for a depth interval $d_3+3d_4$ before being read out for combination with the other measurement signals, the measurement signal corresponding to VGF 50 for a depth interval $d_3+2d_4$, VGF 49 for a depth interval $d_3+d_4$ and VGF 48 for a depth interval $d_3$.

Returning to FIGURE 1 to explain how this above described operation is performed, the measurement signals $C_{EL-S}$ are sampled by each of the storage condensers 25 as they pass the contact brush 31 and are thus stored on the condensers 25 at selected depth levels throughout the borehole. The readout contact brushes 32, 33, 34 and 35 are located at points on the rotating condenser memory 23 corresponding to depth intervals of $d_3$, $d_3+d_4$, $d_3+2d_4$, and $d_3+3d_4$ from the write-in contact brush 31, brush 31 corresponding to the measure point $M_{EL-S}$ of FIGURE 2. Thus, the measurement signals on the readout contact brushes 32–35 correspond to the VGF's 48, 49, 50 and 51 respectively of FIGURE 2.

These readout measurement signals are supplied to a plurality of amplifiers 56–58 which produce currents $I_1$, $I_2$, $I_3$ and $I_4$ in a plurality of resistors of value R. These currents $I_1$–$I_4$ are proportional to the signal voltages read out of the storage capacitors 25 and are combined together for application to the input of a high gain amplifier 59 (e.g., an operational amplifier) having a feedback resistor of value $R/4$. Since the gain of the amplifier 59 is substantially high, the current $I_0$ through the feedback resistor of value $R/4$ must be equal to the sum of the currents $I_1$ through $I_4$ so as to produce zero voltage at the input of the amplifier 59. Thus, the voltage at the output of amplifier 59 will be equal to $$-\frac{R}{4}I_0$$

where $I_0$ is equal to $I_1+I_2+I_3+I_4$. Thus, the voltage V at the output of amplifier 59 is proportional to the average of the measurement signals read out of the rotating capacitor memory 23 and corresponds with the VGF 52 of FIGURE 2.

This averaged signal is supplied as the other input to the computing output signal for recordation as a function of depth by the recorder 42. This computed signal can then be compared with the depth synchronized SP signal on the recording medium of the recorder 42 to provide valuable information as to the formations surrounding the borehole in accordance with the teachings of the above-mentioned copending Dumanior application.

Summarizing the operation of the apparatus of FIGURE 1, and referring to FIGURES 1 and 2 in conjunction, the electrode system and coil system exploring devices of the downhole investigating apparatus 10 of FIGURE 1 are moved through the borehole while investigating the surrounding formations and supplying measurement signals to the control panel 20 at the surface of the earth. The vertical resolution characteristics of the coil system and electrode system exploring devices are represented by the VGF's 45 and 47 respectively of FIGURE 2 which have measure points $M_{IL}$ and $M_{EL-S}$ respectively.

The coil system measurement signal $C_{IL}$ are stored in the memory system 24 and read out at the appropriate depth levels to the weighting and summing network 40 in such a manner as to produce computed measurement signals, each signal corresponding to the computed VGF 46 of FIGURE 2. This memorizing operation causes the computed VGF 46 and thus the coil system computed measurement signal recording point to be depth shifted by an interval $d_1$ from the original measure point $M_{IL}$. At the same time, the electrode system measurement signals $C_{EL-S}$ are stored in the rotating capacitor memory 23 to be read out at depth intervals of $d_3$, $d_3+d_4$, $d_3+2d_4$, and $d_3+3d_4$ later to be averaged by the circuitry comprising amplifiers 55–58, the resistors R, the high gain amplifier 59 and feedback resistor $R/4$. The resulting averaged measurement signals have a vertical resolution characteristic as represented by the VGF 52 of FIGURE 2, i.e., the vertical resolution of these signals corresponds to measurement signals that would be obtained from an exploring device having a vertical resolution as represented by the VGF 52.

It can be seen from FIGURE 2, the coil system computed VGF 46 and the averaged electrode system VGF 52 have approximately the same vertical resolution and have both been depth shifted a sufficient interval that the recording point for both measurement signals is at the same depth level, designated $R_{IL\&EL-S}$ in FIGURE 2.

It may also be desirable to record the electrode system measurement signal $C_{EL-S}$ separately in its original high resolution form and at the same recording point $R_{IL\&EL-S}$ utilized for the other measurement signals recorded by recorder 42. To accomplish this, the readout contact brush 36 is situated at the proper point on the periphery of the rotating capacitor memory 23 corresponding to this recording point $R_{IL\&EL-S}$. In other words, the readout contact brush 36 is an interval $d_3+3/2d_4$ from the read-in contact brush 31. This measurement signal on the readout contact brush 38 is recorded by the recorder 42 via a suitable readout amplifier 61. The VGF corresponding to this unaveraged electrode system measurement signal is designated 62 in FIGURE 2. (The VGF 62 is shown above the remainder of the VGF's in FIGURE 2 for purposes of clarity of the drawing.)

It can be seen then, that in accordance with the present invention, measurement signals derived from a plurality of downhole exploring devices having unequal vertical resolution characteristics and dissimilar measure points can be processed in such a manner that the processed signals have substantially equal vertical resolution characteristics and identical recording points. By so doing, the processed measurement signals can be combined in computing device in such a manner as to produce meaningful results.

It is to be understood that while only coil system and electrode system exploring devices have been shown in the FIGURES 1 and 2 embodiment, any suitable type of exploring device could be utilized in accordance with the teachings of the present invention. Additionally, while only four of the memorized measurement signals were utilized to provide the averaged measurement signal, it is to be understood that any number of these raw measurement signals could be utilized to produce the desired results.

While there has been described what is at present considered to be a preferred embodiment of this invention, it will be obvious to those skilled in the art that various changes and modifications may be made therein without departing from the invention, and it is therefore, intended to cover all such changes and modifications as fall within the true spirit and scope of the invention.

What is claimed is:

1. Apparatus for processing well logging measurements representative of at least one characteristic of earth formations adjacent a borehole, comprising:
    (a) means for producing first well logging measurement signals having a first vertical resolution characteristic and derived from a first exploring means;
    (b) means for producing second well logging measurement signals derived from a second exploring means having a second vertical resolution characteristic, said second resolution being sharper than said first resolution;
    (c) means for storing said second well logging measurement signals, said stored measurement signals being representative of measurements taken at selected depth levels along the borehole; and
    (d) means for combining a predetermined number of said stored measurement signals to produce output measurement signals which have a vertical resolution characteristic appproximating the vertical resolution characteristic of said first measurement signals.

2. Apparatus for processing well logging measurements representative of at least one characteristic of earth formations adjacent a borehole, comprising:
    (a) means for producing first well logging measurement signals having a first vertical resolution characteristic and derived from a first exploring means;
    (b) means for producing second well logging measurement signals derived from a second exploring means having a second vertical resolution characteristic, said second resolution being sharper than said first resolution;
    (c) means for storing said second well logging measurement signals, said stored measurement signals being representative of measurements taken at selected depth levels along the borehole;
    (d) means for reading out a selected number of the stored measurement signals; and
    (e) means for averaging the readout measurement signals to produce an averaged measurement signal which has a vertical resolution characteristic approximating the vertical resolution characteristic of said first measurement signals.

3. Apparatus for processing well logging measurements representative of at least one characteristic of earth formations adjacent a borehole, comprising:
    (a) means for producing a first well logging measurement signal having a first vertical resolution characteristic and derived from a first exploring means, said first measurement signal representing the measurement taken at a first borehole depth level;
    (b) means for producing second well logging measurement signals derived from a second exploring means having a second vertical resolution characteristic, said second resolution being sharper than said first resolution;
    (c) means for storing said second well logging measurement signals, said stored measurement signals being representative of measurements taken at selected depth levels along the borehole;
    (d) readout means for reading out selected ones of the stored measurement signals; and
    (e) means for averaging the readout measurement signals to produce an averaged measurement signal which has a vertical resolution characteristic approximating the vertical resolution characteristic of said first measurement signals, the readout means being operative to read out those measurement signals that will position the recording point of the averaged measurement signal at the same relative depth level as the depth level of the first measurement signal.

4. Apparatus for processing well logging measurements representative of at least one characteristic of earth formations adjacent a borehole, comprising:
   (a) means for producing first well logging measurement signals derived from a first exploring means having a first vertical resolution characteristic;
   (b) means for storing said first measurement signals, said stored measurement signals representing measurements taken at selected depth levels along the borehole;
   (c) means for combining selected ones of the stored first measurement signals to produce a computed first measurement signal having a sharper vertical resolution characteristic;
   (d) means for producing second well logging measurement signals derived from a second exploring means having a second vertical resolution characteristic, said second resolution being sharper than said first resolution;
   (e) means for storing said second well logging measurement signals, said stored measurement signals representing measurements taken at selected depth levels along the borehole; and
   (f) means for combining a predetermined number of said stored second measurement signals to produce an output measurement signal which has a vertical resolution characteristic approximating the vertical resolution characteristic of said first computed measurement signal.

5. Apparatus for processing well logging measurements representative of at least one characteristic of earth formations adjacent a borehole, comprising:
   (a) means for producing first well logging measurement signals derived from a first exploring means having a first vertical resolution characteristic;
   (b) means for storing said first measurement signals, said stored measurement signals representing measurements taken at selected depth levels along the borehole;
   (c) means for combining selected ones of the stored first measurement signals to produce a computed first measurement signal having a sharper vertical resolution characteristic, said first computed measurement signal corresponding to a measurement taken at a first depth level in the borehole;
   (d) means for producing second well logging measurement signals derived from a second exploring means having a second vertical resolution characteristic, said second resolution being sharper than said computed first resolution characteristic;
   (e) means for storing said second well logging measurement signals, said stored measurement signals representing measurements taken at selected depth levels along the borehole;
   (f) readout means for reading out selected ones of the stored second measurement signals; and
   (g) means for averaging the readout second measurement signals to produce an averaged measurement signal which has a vertical resolution characteristic approximating the vertical resolution characteristic of said first computed measurement signal, the readout means being operative to read out those second measurement signals that will position the recording point of the averaged measurement signal at the same relative depth level as the depth level of the first computed measurement signal.

6. A method of investigating earth formations adjacent a borehole, comprising:
   (a) measuring a characteristic of earth formations traversed by a borehole with a first exploring means to produce measurements having a first vertical resolution characteristic;
   (b) measuring a characteristic of earth formations traversed by a borehole with a second exploring means having a second vertical resolution characteristic, said second resolution being sharper than said first resolution;
   (c) storing the measurements derived from the second exploring means, said stored measurements representing measurements taken at selected depth levels along the borehole; and
   (d) combining a predetermined number of said stored measurements to produce an output measurement which has a vertical resolution characteristic approximating the vertical resolution characteristic of said first measurement.

7. A method of investigating earth formations adjacent a borehole, comprising:
   (a) measuring a characteristic of earth formations traversed by a borehole with a first exploring means to produce measurements having a first vertical resolution characteristic;
   (b) measuring a characteristic of earth formations traversed by a borehole with a second exploring means having a second vetrical resolution characteristic, said second resolution being sharper than said first resolution;
   (c) storing the measurements derived from the second exploring means, said stored measurements representing measurements taken at selected depth levels along the borehole;
   (d) reading out selected ones of the stored measurements; and
   (e) averaging the readout measurements to produce an averaged measurement which has a vertical resolution characteristic approximating the vertical resolution characteristic of the measurement derived from the second exploring means.

8. A method of investigating earth formations adjacent a borehole, comprising:
   (a) measuring a characteristic of earth formations traversed by a borehole with a first exploring means having a first vertical resolution characteristic;
   (b) storing the measurements derived from the first exploring means, said stored measurements representing measurements taken at selected depth levels along the borehole;
   (c) combining selected ones of the stored measurements to produce a computed measurement having a new vertical resolution characteristic;
   (d) measuring a characteristic of earth formations traversed by a borehole with a second exploring means having a second vertical resolution characteristic, said second resolution characteristic being sharper than said first resolution characteristic;
   (e) storing the measurements derived from the second exploring means, said stored measurements representing measurements taken at selected depth levels along the borehole;
   (f) reading out selected ones of the stored measurements derived from the second exploring means; and
   (g) averaging the readout measurements to produce an averaged measurement which has a vertical resolution characteristic approximating the vertical resolution characteristic of said computed measurement.

References Cited

UNITED STATES PATENTS

| | | | |
|---|---|---|---|
| 3,166,709 | 1/1965 | Doll | 324—6 |
| 3,263,159 | 7/1966 | Albright | 324—1 |
| 3,397,356 | 8/1968 | Dumanoir | 324—1 |

GERARD R. STRECKER, Primary Examiner

U.S. Cl. X.R.

324—6, 10